United States Patent
Thorpe

(10) Patent No.: US 9,989,379 B2
(45) Date of Patent: Jun. 5, 2018

(54) TECHNIQUES FOR COUNTING RESOURCE USAGE

(71) Applicant: LANDIS+GYR INNOVATIONS, INC., Alpharetta, GA (US)

(72) Inventor: John Thorpe, Alpharetta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 135 days.

(21) Appl. No.: 15/263,683

(22) Filed: Sep. 13, 2016

(65) Prior Publication Data

US 2018/0073893 A1    Mar. 15, 2018

(51) Int. Cl.
*G01F 15/06* (2006.01)
*G01D 4/02* (2006.01)

(52) U.S. Cl.
CPC ....................................... *G01D 4/02* (2013.01)

(58) Field of Classification Search
CPC .................. Y02P 90/84; A63B 71/0622; A63B 2022/0652; A63F 2300/69; A63F 13/65
See application file for complete search history.

(56) References Cited

U.S. PATENT DOCUMENTS

| | | | | |
|---|---|---|---|---|
| 4,926,678 A | * | 5/1990 | Pearman | G01F 25/0053 73/1.27 |
| 2012/0274478 A1 | * | 11/2012 | Stenson | G01F 15/063 340/870.02 |

* cited by examiner

*Primary Examiner* — Sibin Chen
(74) *Attorney, Agent, or Firm* — Kilpatrick Townsend & Stockton LLP

(57) ABSTRACT

Disclosed are various systems and methods related to improving the accuracy of resource usage counting of a metered resource by a computing device. The computing device disables interrupts used by the processor to count pulses received from a utility meter on respective first and second wires of a cable. A data level for the first wire attached to the one or more sensors of the computing device is detected and recorded. The data level indicating whether a pulse is presently being received on the first wire. The computing device then disconnects a common ground in the cable between the computing device and the utility meter, and initiates performance of a test of the cable. The computing device then restores the individual interrupts and the common ground in a defined sequence based upon detection of a pulse in one of the two wires.

20 Claims, 5 Drawing Sheets

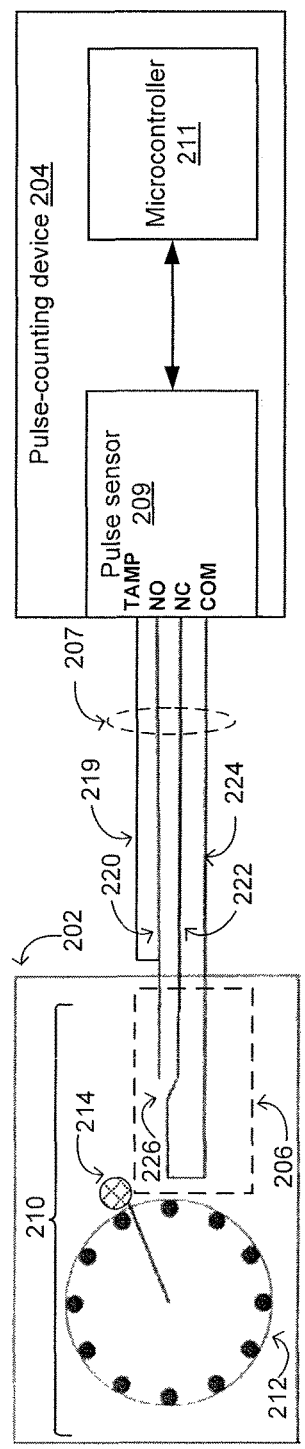
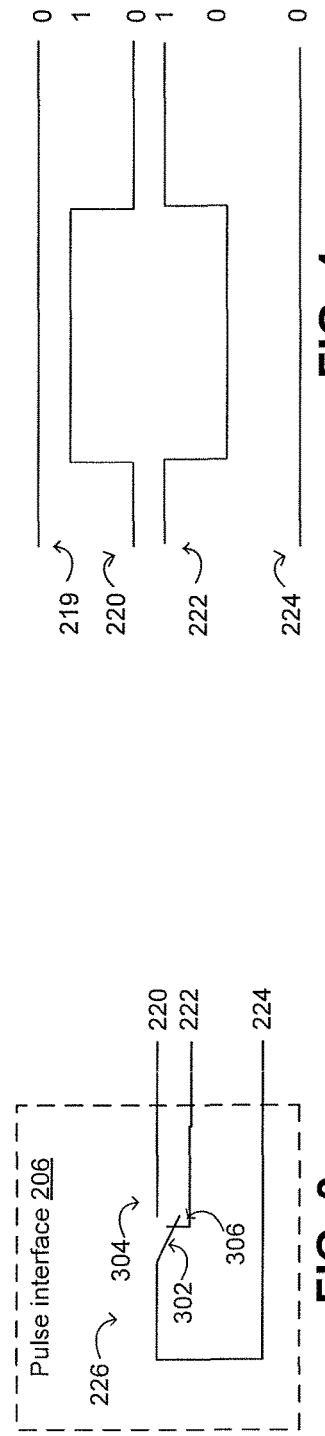
FIG. 2
FIG. 3
FIG. 4

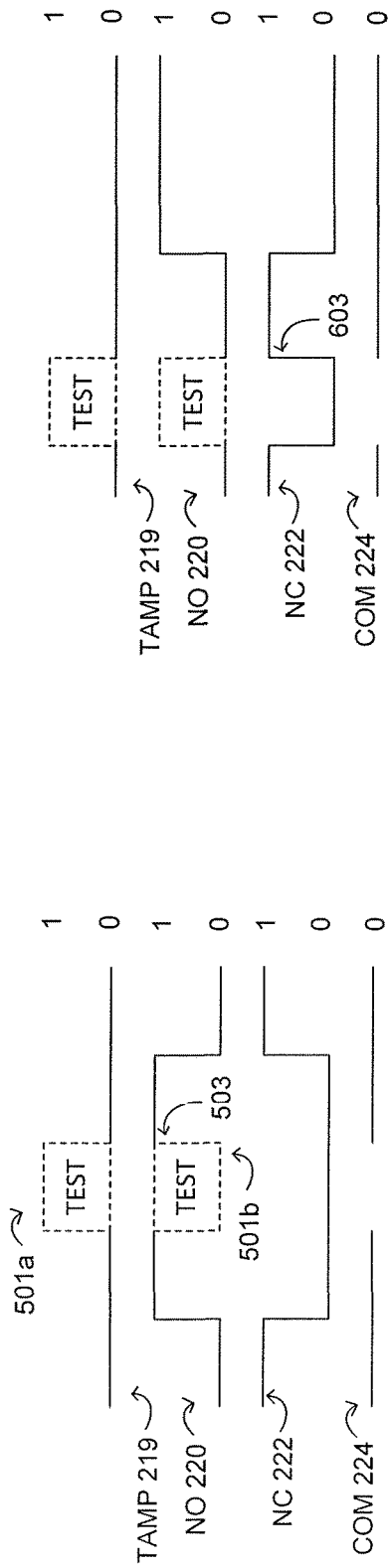

TECHNIQUES FOR COUNTING RESOURCE USAGE

BACKGROUND

Metering devices are used to measure consumption of resources. Examples of metering devices include electricity meters, water meters, gas meters, steam meters, electronic volume correctors, etc. (generally referred to as "utility meters"). A metering device may communicate consumption of a given resource through a pulse source communicating with a pulse-counting device. The communication of consumption may be carried out using electrical pulses.

The pulse source may be in a location that is remote from the pulse-counting device, whereby the pulse source is connected to the pulse-counting device via a data cable having one or more wires. For various possible reasons, the cable between these two devices can become cut or damaged, which would prevent the pulse-counting device from measuring consumption since pulses would not be received from the pulse source. To protect against this issue, a cable test is employed by the pulse-counting device periodically to verify that the cable is intact.

Due to requirements that the pulse-counting device not interfere with the pulse source, the pulse-counting device should be electrically disconnected from the pulse source while the test is in progress. During the period of time in which the test occurs, resources may still be consumed and the pulse source may still send pulses. However, the pulse-counting device cannot receive the pulses sent during the test since the two devices are electrically disconnected. What is needed is a way to accurately count pulses while performing the cable test.

SUMMARY

Various aspects of the present invention relate to techniques for improving the accuracy of resource usage counting of a metered resource by a computing device. To this end, the computing device disables first and second interrupts used by the processor to count pulses received from a utility meter on respective first and second wires of a cable. A data level for the first wire attached to the one or more sensors of the computing device is detected and recorded. The data level indicates whether an electrical pulse is presently being received on the first wire. The computing device then disconnects a common ground in the cable between the computing device and the utility meter, and initiates performance of a test of the cable.

In response to the test of the cable concluding and detection of the pulse on the first wire, the computing device enables the second interrupt corresponding to the second wire while the common ground is disconnected and the first interrupt is disabled. Then the computing device electrically connects the common ground while the first interrupt is disabled and the second interrupt is enabled. Next, the computing device enables the first interrupt corresponding to the first wire on which the pulse was detected.

In response to the test of the cable concluding and no pulse detected on the first wire, the computing device enables the first interrupt corresponding to the first wire while the common ground is disconnected and the second interrupt is disabled. Then the computing device electrically connects the common ground while the second interrupt is disabled and the first interrupt is enabled. Next, the computing device enables the second interrupt corresponding to the second wire.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2 is a block diagram of a pulse source having a three-wire pulse interface connected to a pulse-counting device via a data cable.

FIG. 3 is a schematic diagram of a pulse interface having a single pole, double throw switch connecting to three interface wires.

FIG. 4-6 are example graphs of voltage levels corresponding to logical states on the wires of a four-wire pulse sensor.

DETAILED DESCRIPTION

Figure 1:
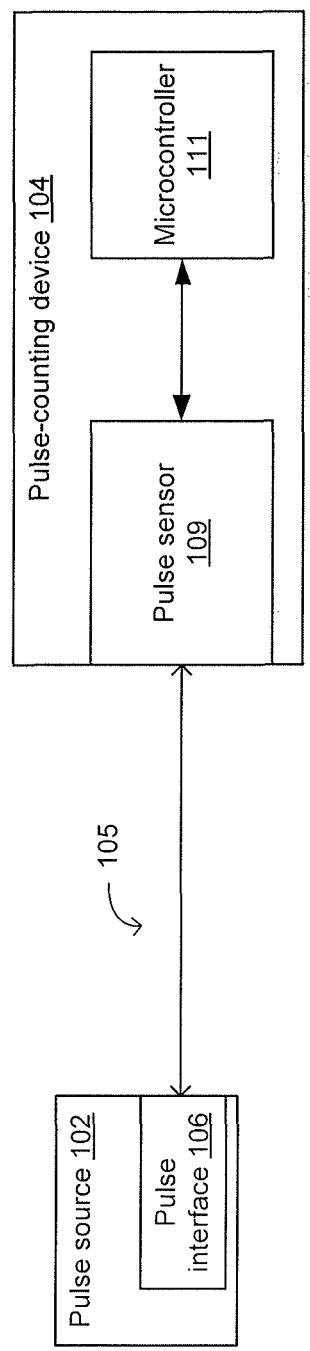
FIG. 1 is a block diagram of a pulse source communicating with a pulse-counting device via a data cable.

Systems and methods are provided for improving the accuracy of resource usage counting of a metered resource. As shown in FIG. 1, a pulse source 102 is attached to a pulse-counting device 104 via a data cable 105. The pulse source 102 can be a resource metering device, such as a utility meter, or any other device that produces electrical pulses (or simply "pulses") to indicate volume, consumption, events, and/or alarms. The pulse source 102 can include a pulse interface 106 configured to communicate a given unit of consumption by communicating one or more pulses corresponding to the given unit of consumption.

The pulse-counting device 104 may be any computing device or other electronic device configured to count or otherwise accumulate pulses received from the pulse-source 102. The accumulated pulses indicate total resource consumption. The pulse-counting device 104 may store counts and alarm events to be periodically read from the device. The pulse-counting device 104 may include a pulse sensor 109 that receives pulses via one or more inputs. In some implementations, the pulse sensor 109 is representative of a plurality of sensors where, for example, a sensor may be used for an individual input. Upon receiving a pulse, the pulse sensor 109 notifies the microcontroller 111 of the pulse and the input on which it was received. Among other tasks, the microcontroller 111 may maintain a count of the resource consumption and the pulses received on the various inputs of the pulse-counting device 104. The pulse-counting device 104 may be included in a system, such as an automated meter reading (AMR) system, that includes a radio transceiver (not shown) for communicating data between an administrative server and/or other devices.

Various types of pulse sources exist that use different pulse interfaces with different pulse signaling to indicate resource consumption—one type may indicate one unit of resource consumption using one pulse, while another type indicates one unit of resource consumption using two pulses. For example, as shown in FIG. 2, one type of pulse source device 202 includes a pulse interface 206 that uses a data cable 207 to connect to a pulse sensor 209 of a pulse-counting device 204. The wires of the data cable 207 may also be referred to as "data lines." The pulse-producing circuit 210 includes the pulse interface 206 and a rotating dial pointer 212 attached to a magnet 214.

The data cable 207 can include a tamper wire 219 (TAMP), a normally open (NO) wire 220, a normally closed (NC) wire 222, and a common (COM) wire 224. The pulse sensor 209 of the pulse-counting device 204 includes a four-wire interface connected to the data cable 207, including a tamper wire 219, a normally open wire 220, a normally closed wire 222, and a common wire 224. Three of these four wires, the normally open wire 220, the normally closed wire 222, and the common wire 224, can be connected to the pulse interface 206 of the pulse source device 202 via the data cable 207. The tamper wire 219 may be electrically connected to the normally open wire 220 near the point at which the data cable 207 connects to the pulse source device 202.

The pulse interface 206 can include a single-pole, double throw ("SPDT") switch 226. Non-limiting examples of the SPDT switch 226 include a Form C magnetic reed switch or Hall effect device. The diagram of FIG. 3 depicts the pulse interface 206 including the SPDT switch 226. The SPDT switch 226 can include an armature 302, a normally open contact 304, and a normally closed contact 306. The rotating dial pointer 212 can be rotated to generate a pulse.

Rotating the rotating dial pointer 212 can bring the magnet 214 attached to the rotating dial pointer 212 in proximity to the pulse interface 206. The pulse interface 206 can change state in response to the magnet 214 being positioned in proximity to the SPDT switch 226. The pulse interface 206 changing state includes the armature 302 being switched between the normally open contact 304 and the normally closed contact 306. The three-wire pulse interface 206 communicates change in state to the pulse-counting device 204 via the cable 207.

In various implementations, the pulse-counting device 204 includes a de-bounce circuit (not shown) that distinguishes voltage changes on a data line (e.g., the normally open wire 220) that should represent a pulse from electrical noise that should not represent a pulse. To this end, the de-bounce circuit may use a voltage threshold that specifies a minimum received voltage and/or minimum duration of the received voltage that will be identified as a pulse.

The graph in FIG. 4 depicts voltage levels on the wires 219, 220, 222, 224 of the four-wire pulse sensor 209. The magnet 214 being distant from the SPDT switch 226 can cause the armature 302 to be connected to the normally closed contact 306 and the normally open wire 220 to be disconnected from the common wire 224. The normally open wire 220 being disconnected from the common wire 224 can cause the voltage on the normally open wire 220 to be low (i.e., the "0" state) and the voltage on the normally closed wire 222 to be high (i.e., the "1" state). Rotating the rotating dial pointer 212 can bring the magnet 214 in proximity to the SPDT switch 226. The magnet 214 being near the SPDT switch 226 can cause the armature 302 to be connected to the normally open contact 304 and the normally open wire 220 to be connected to the common wire 224. The normally open wire 220 being connected to the common wire 224 can cause the voltage on the normally open wire 220 to be high (i.e., the pulsed state or "1" state) and the voltage on the normally closed wire 222 to be low (i.e., the non-pulsed state or "0" state).

In a SPDT switch 226 (such as a Form C switch), respective voltages at the normally open contact 304 and normally closed contact 306 of the SPDT switch 226 are in opposite states. As a consequence of one unit of resource usage, the rotating dial pointer 212 makes one rotation causing the normally open wire 220 and the normally closed wire 222 to each transition, albeit at different times, from a low state to a high state (and vice-versa). The pulse sensor 209 detects and reports these pulses, as well as the wire on which the pulse was detected, to the microcontroller 211 using interrupts. For example, when the voltage on the normally open wire 220 transitions from the low to the high state, the pulse sensor 209 notifies the microcontroller 211 that a pulse has occurred on the input for the normally open wire (also referred to as the "NO" input) by triggering the interrupt for the normally open wire on the microcontroller 211. Similarly, when the voltage on the normally closed wire 222 transitions from the low to the high state, the pulse sensor 209 notifies the microcontroller 211 that a pulse has occurred on the input for the normally closed wire (also referred to as the "NC" input) by triggering the interrupt for the normally closed wire on the microcontroller 211.

The microcontroller 211 stores a count of the pulses received on each of the NO and NC inputs. The microcontroller 211 is further configured to conduct tests of the cable 207. The example illustration of FIG. 5 shows voltage levels on the wires 219, 220, 222, 224 of the four-wire pulse sensor 209 that may occur when a cable test is conducted during normal operation of the pulse-counting device 204. As shown prior to beginning the cable test, the voltage on the normally open wire 220 transitions to high (i.e., the "1" state), while at the same time the normally closed wire 222 transitions to low (i.e., the "0" state). Thereafter, the pulse-counting device 204 determines that a cable test should be performed, which may occur on a schedule-driven and/or event-driven basis. Prior to the test beginning, the interrupts used by the microcontroller 211 to count pulses are disabled, and the common wire 224 between the pulse source 202 and the pulse-counting device 204 is electrically disconnected. Then, as shown in FIG. 5, the output of the pulse sensor 209 that is attached to the tamper wire 219 (also referred to as the "TAMP" output) sends one or more electrical test signals 501a to be received by the NO input as the test signals 501b. In the event the test signals 501b are received by the NO input, the cable 207 passes the test. Otherwise, if the test signals 501b are not received, the cable 207 fails to pass the test and an alarm may be raised. Typically, the duration of the cable test (~3 ms) is substantially less than the duration of an electrical pulse used to indicate resource consumption (~10+ ms).

Following the conclusion of the test, the interrupts are re-enabled and the common ground wire 224 is electrically reconnected to restore the pulse-counting device 204 to normal operation. However, as demonstrated in the example below, traditional methods allow counting inaccuracies to occur as the pulse-counting device 204 transitions back to normal operation. For example, consider the scenario shown in FIG. 5 where the test is conducted in the middle of an electrical pulse on the normally open wire 220. If, following the test, the interrupt for the normally open wire 220 is re-enabled before the common wire 224 is reconnected, the microcontroller 211 would receive an interrupt from another rising clock edge at the point 503 since the previous pulse is still on-going (i.e., voltage from the pulse interface 206 is high) when the common wire 224 is reconnected. In this example scenario, the microcontroller 211 may incorrectly increase the consumption count based on two state transitions observed (e.g., before the test and following the test) on the NO input of the pulse sensor 209, though only a single pulse was actually produced from the pulse source 202.

Using techniques disclosed herein, the sequence in which the interrupts are re-enabled and the common wire 224 is reconnected can be correctly determined to ensure that the electrical pulses are accurately counted by the pulse-counting device 204. The correct determination is based on the states of the normally open wire 220 and the normally closed wire 222 prior to beginning the cable test. For example, in the scenario of FIG. 5, a pulse was being produced on the normally open wire 220 when the test began, as can be sensed by the NO input of the pulse sensor 209. Thus, in this scenario, the common wire 224 should be electrically reconnected before the interrupt for the normally open wire 220, in order to ensure that this interrupt is not notified of a second rising clock edge at the point 503 for the on-going pulse being received (as described in the preceding example).

However, to ensure the accurate counting of pulses, the state of the normally closed wire 222 must also be considered, as it also receives pulses from the pulse source 202. As shown in FIG. 5, at the time the test began the normally closed wire 222 was not receiving a pulse, as can be sensed by the NC input of the pulse sensor 209. Thus, the interrupt for the normally closed wire 222 should be enabled before common wire 224 is reconnected, since, if it is still in the non-pulsed state, no new pulse would be counted. Although not shown in FIG. 5, if the test completed as the normally closed wire 222 would be entering or was within the pulsed state, enabling the normally closed interrupt prior to reconnecting the common wire 224 would allow the interrupt to receive notice of the transition and for the microcontroller 211 to count the pulse received via the NC input of the pulse sensor 209. Therefore, in the scenario shown in FIG. 5 in which, prior to beginning the cable test, the normally open wire 220 is receiving a pulse, while the normally closed wire 222 is not receiving a pulse, the pulse-counting device 204 should follow the sequence of: (i) re-enabling the interrupt for the normally closed wire 222; (ii) reconnecting the common wire 224; and (iii) re-enabling the interrupt for the normally open wire 220.

The exemplary illustration of FIG. 6 presents the alternate scenario in which the test of the cable 207 occurs while the normally open wire 220 is not receiving a pulse, but while the normally closed wire 222 is receiving a pulse. Thus, following a cable test, the interrupt for the normally open wire 220 should be enabled before common wire 224 is reconnected, since, if it is still in the non-pulsed state, no new pulse would be counted. Although not shown in FIG. 6, if the test completed as the normally open wire 220 would be entering or was within the pulsed state, enabling the normally open interrupt prior to reconnecting the common wire 224 would allow the interrupt to receive notice of the transition and for the microcontroller 211 to count the pulse received via the NO input of the pulse sensor 209.

As for the normally closed wire 222 in the scenario of FIG. 6, it was in a pulsed state prior to start of the cable test, as can be sensed by the NC input of the pulse sensor 209. As such, the common wire 224 should be electrically reconnected before the interrupt for the normally closed wire 222 in order to ensure that this interrupt is not notified of a second rising clock edge at the point 603 for the on-going pulse being received. Therefore, in the scenario shown in FIG. 6 in which, prior to beginning the cable test, the normally open wire 220 is not receiving a pulse, while the normally closed wire 222 is receiving a pulse, the pulse-counting device 204 should follow the sequence of: (i) re-enabling the interrupt for the normally open wire 220; (ii) reconnect the common wire 224; and (iii) re-enabling the interrupt for the normally closed wire 222.

The sequence of re-enabling interrupts and reconnecting the common ground wire 224 can be further generalized as: (i) re-enabling the interrupt for the wire not receiving a pulse prior to the cable test; (ii) reconnecting the common wire 224; and (iii) re-enabling the interrupt for the other wire (i.e., the wire that was receiving the pulse).

Figure 7:
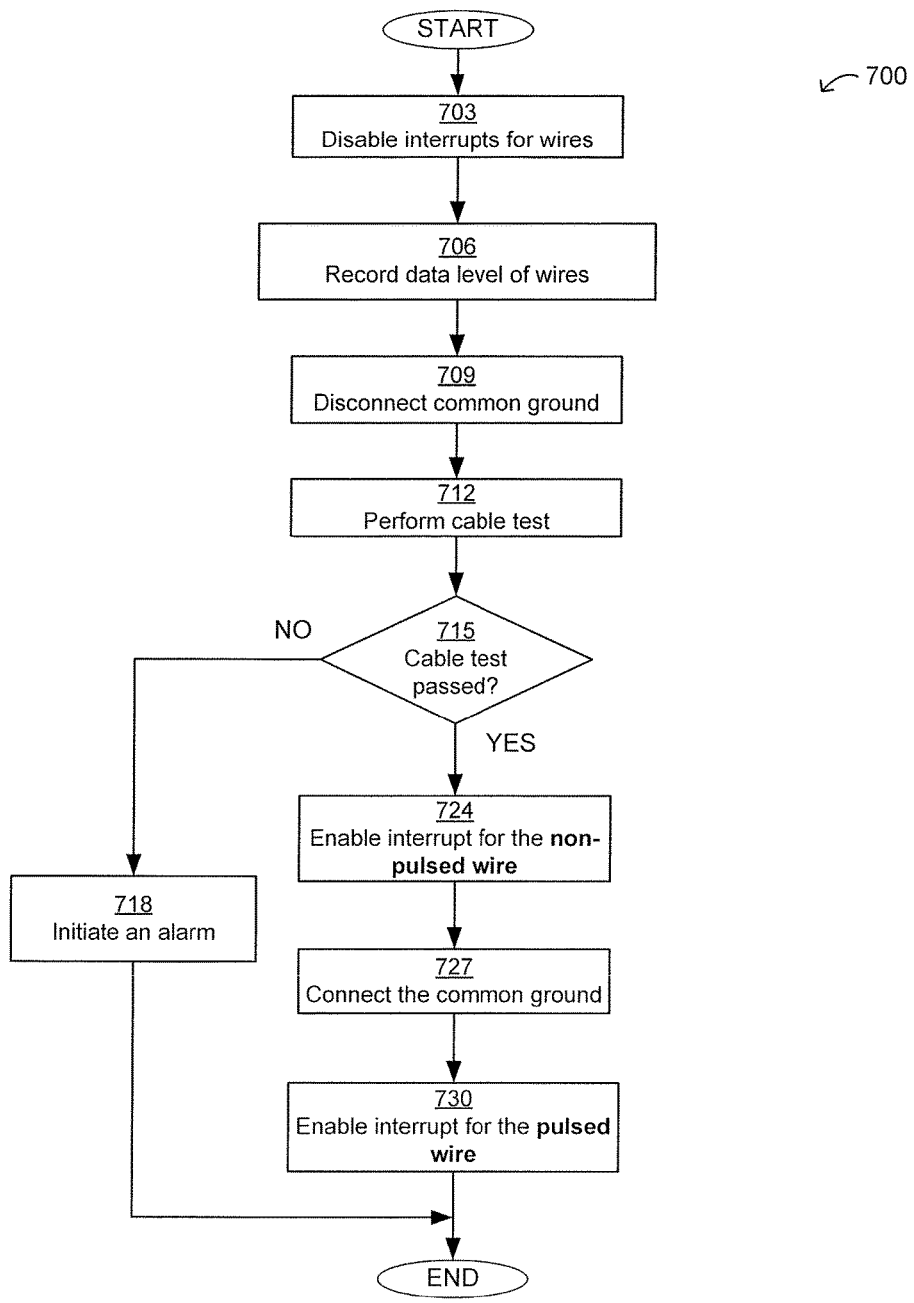
FIG. 7 is a flowchart illustrating one example of functionality for performing a cable test implemented in a computing device according to various aspects of the present disclosure.

Referring next to FIG. 7, shown is a flowchart that provides one example of a portion of the cable testing operations implemented in a computing device according to various embodiments. It is understood that the flowchart of FIG. 7 provides merely an example of the many different types of functional arrangements that may be employed to implement the portion of the cable testing operations as described herein. As an alternative, the flowchart of FIG. 7 may be viewed as depicting an example of elements of a method 700 implemented in a computing device, such as a pulse-counting device, according to one or more embodiments. The operations depicted in the flowchart of FIG. 7 may be initiated in response to the pulse-counting device determining that a cable test should be initiated.

Beginning with block 703 and prior to the test beginning, the pulse-counting device disables interrupts used by the microcontroller to count pulses received on the wires for the NO and NC inputs. For example, the interrupts may be disabled by setting an interrupt mask for the microcontroller and/or by disabling the interrupt handler for these interrupts. While the interrupts are disabled, pulses sensed by the pulse sensor of the pulse-counting device will not be counted by the microcontroller. Next, in block 706, the pulse-counting device records the data level of the normally open and normally closed wires in order to determine whether each of the wires is presently in a low state (i.e., non-pulsed) or high state (i.e., pulsed) before beginning the cable test. The data levels for the wires can be sensed by the corresponding inputs of the pulse sensor of the pulse-counting device. In some implementations, the pulse-counting device records the data level on just one of the wires based on the assumption that the other wire is in the opposite state (e.g., one wire pulsed and the other wire is non-pulsed).

Then, in block 709, the pulse-counting device electrically disconnects the common ground wire (also referred to as the "common wire") that is part of the cable connecting the pulse-counting device and the pulse source device. While the common wire is disconnected, pulses produced by the pulse source on the normally open and normally closed wires will not be received by the pulse-counting device. Subsequently, in block 712, the pulse-counting device initiates performance of the cable test, which may include sending short pulses, a test pattern, and/or other electrical signals from the TAMP output of the pulse-counting device. In an intact cable, the tamper wire is connected to the normally open wire at a point in the cable adjacent to the pulse source device, such that an electrical signal produced by the pulse-counting device on the tamper wire should be received on the normally open wire attached to the NO input of the pulse-counting device. Typically, the duration of the cable test (~3 ms) is substantially less than the duration of an electrical pulse used to indicate resource consumption (~10+ ms).

Next, in block 715, the pulse-counting device determines if the cable successfully passes the test indicating that the cable is not cut or otherwise damaged. If the electrical signal produced by the TAMP output was not received by the NO input, then the cable is damaged and, in block 718, the pulse-counting device initiates an alarm indicating the damage was detected. In some implementations, the pulse-counting device may transmit the alarm to an administrative server via a wireless network and/or other accessible network. Alternatively, if the electrical signal produced by the TAMP output was received by the NO input, then the cable successfully passes the test and the pulse-counting device prepares to resume normal pulse counting operation in the pulse-counting device.

Subsequently, in block 724, the pulse-counting device first enables the interrupt corresponding to the input for the wire in which no pulse was being recorded (non-pulsed) prior to beginning the test. Thus, if the wire is still in the non-pulsed state when the common wire is later connected, no new pulse would be counted. Alternatively, if the test completed as the non-pulsed wire would be entering or was within the pulsed state (when the common wire is later connected), enabling the interrupt prior to reconnecting the common wire would allow the interrupt to receive notice of the transition and for the microcontroller to count the pulse received via the respective input of the pulse sensor.

Next, in block 727, the common wire is electrically reconnected between the pulse-counting device and the pulse source, thereby allowing the pulse-counting device to sense any voltage applied to the wires by the pulse source. Although a pulse on a wire may be sensed by the pulse-counting device, a pulse will not be counted by the microcontroller unless the interrupt corresponding to the particular wire is enabled.

Subsequently, in block 730, the pulse-counting device enables the interrupt corresponding to the input for the wire in which a pulse was being recorded prior to beginning the test. The interrupt for the pulsed wire is enabled following the reconnection of the common wire in order to ensure that this interrupt is not triggered by a second rising clock edge (i.e., as the common wire is reconnected) in the event that the pulse recorded prior to the test is still on-going.

Figure 8:
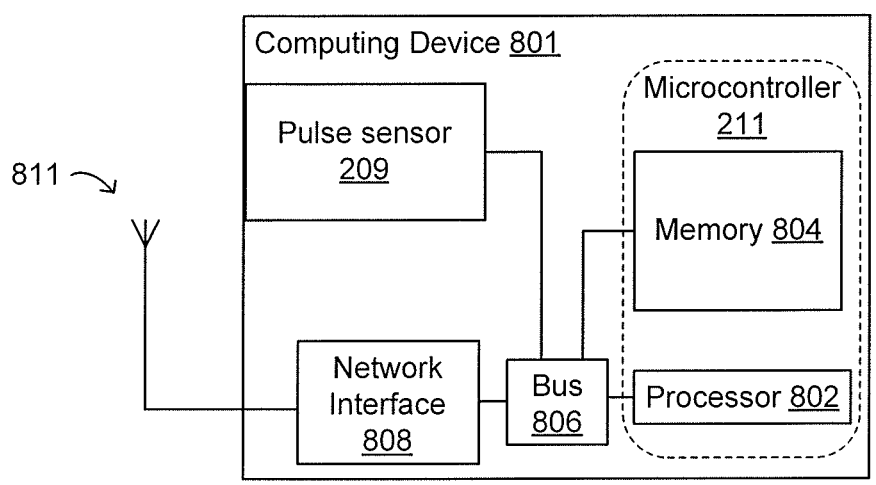
FIG. 8 is a block diagram that provides an example illustration of a computing device that implements the pulse source detection functionality according to various aspects of the present disclosure.

Next, in FIG. 8, shown is another block diagram depicting an example of a computing device 801, such as a pulse-counting device 204, used for implementing the techniques disclosed herein. The computing device 801 can include a processing device 802. Non-limiting examples of the processing device 802 include a microprocessor, an application-specific integrated circuit ("ASIC"), a state machine, or other suitable processing device. The processing device 802 can include any number of processing devices, including one. The processing device 802 can be communicatively coupled to computer-readable media, such as memory device 804. The processing device 802 can execute computer-executable program instructions and/or access information respectively stored in the memory device 804. In some implementations, the processor 802 and memory 804 may be incorporated as components of a microcontroller, such as the microcontroller 211.

The memory device 804 can store instructions that, when executed by the processing device 802, cause the processing device 802 to perform operations described herein. The memory device 804 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, flash memory, memory chip(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, and the like.

The computing device 801 can also include a bus 806 that can communicatively couple one or more components of the computing device 801. Although the processor 802, the memory 804, the bus 806, the pulse sensor 209, and other components are depicted in FIG. 8 as separate components in communication with one another, other implementations are possible. For example, the processor 802, the memory 804, the bus 806, and the pulse sensor 209 can be components of printed circuit boards or other suitable devices that can be disposed in a computing device 801 to store and execute programming code.

The computing device 801 can also include a network interface device 808, such as may be implemented by a radio. The network interface device 808 can be a transceiving device configured to establish one or more of the wireless communication links via an antenna 811. A non-limiting example of the network interface device 808 is an RF transceiver and can include one or more components for establishing a communication links to other computing devices in a mesh network, such as specified by IEEE 802.15.4, Wi-SUN, and/or other possible network standards.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the some blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

Therefore, the following is claimed:

1. A computing device, comprising:
    a processor;
    one or more sensors for detecting electrical pulses received from a plurality of wires in a cable;
    a radio for communicating on a network accessible to the computing device; and
    a memory configured by an application executed in the computing device to perform a test of the cable, the application comprising logic causing the computing device to:
        disable first and second interrupts used by the processor to count pulses received from a utility meter on respective first and second wires of the cable;
        detect and record a data level for the first wire attached to the one or more sensors of the computing device, the data level indicating whether a pulse is presently being received on the first wire;
        disconnect a common ground in the cable between the computing device and the utility meter;
        initiate performance of the test of the cable; and
        in response to the test of the cable concluding and detection of the pulse on the first wire:
            enable the second interrupt corresponding to the second wire while the common ground is disconnected and the first interrupt is disabled;
            connect the common ground while the first interrupt is disabled and the second interrupt is enabled; and
            enable the first interrupt corresponding to the first wire on which the pulse was detected.

2. The computing device of claim 1, further comprising logic that, in response to the test of the cable concluding and no pulse detected on the first wire, causes the computing device to:
    enable the first interrupt corresponding to the first wire while the common ground is disconnected and the second interrupt is disabled;
    connect the common ground while the second interrupt is disabled and the first interrupt is enabled; and
    enable the second interrupt corresponding to the second wire.

3. The computing device of claim 1, wherein the computing device is part of a mesh network comprising other computing devices attached to utility meters.

4. The computing device of claim 1, further comprising logic causing the computing device to transmit an alarm to an administrative server accessible via the network when the cable fails to pass the test.

5. The computing device of claim 1, further comprising logic causing the computing device to distinguish voltage changes on the wires representing pulses from electrical noise.

6. The computing device of claim 1, wherein the first wire is connected to a normally open (NO) input on the one or more sensors, and the second wire is connected to a normally closed (NC) input on the one or more sensors.

7. The computing device of claim 1, wherein the one or more sensors further comprises a tamper output connected to a tamper line in the cable, the tamper output used to conduct the test of the cable.

8. A method for improving the accuracy of resource usage counting of a metered resource by a computing device, the method comprising:
    disabling first and second interrupts used by a processor of the computing device to count pulses received from a utility meter on respective first and second wires of a cable;
    detecting and recording, by the processor, a data level for the first wire attached to one or more sensors of the computing device, the data level indicating whether a pulse is presently being received on the first wire;
    disconnecting, by the processor, a common ground in the cable between the computing device and the utility meter;
    initiating, by the processor, performance of a test of the cable; and
    in response to the test of the cable concluding and detection of the pulse on the first wire:
        enabling, by the processor, the second interrupt corresponding to the second wire while the common ground is disconnected and the first interrupt is disabled;
        connecting, by the processor, the common ground while the first interrupt is disabled and the second interrupt is enabled; and
        enabling, by the processor, the first interrupt corresponding to the first wire on which the pulse was detected.

9. The method of claim 8, wherein in response to the test of the cable concluding and no pulse detected on the first wire, causing the computing device to:
- enable the first interrupt corresponding to the first wire while the common ground is disconnected and the second interrupt is disabled;
- connect the common ground while the second interrupt is disabled and the first interrupt is enabled; and
- enable the second interrupt corresponding to the second wire.

10. The method of claim 8, wherein the computing device is part of a mesh network comprising other computing devices attached to utility meters.

11. The method of claim 8, further comprising distinguishing, by the processor, voltage changes on the wires representing pulses from electrical noise.

12. The method of claim 11, further comprising causing the computing device to transmit an alarm to an administrative server accessible via a network when the cable fails to pass the test.

13. The method of claim 8, wherein the first wire is connected to a normally open (NO) input on the one or more sensors, and the second wire is connected to a normally closed (NC) input on the one or more sensors.

14. The method of claim 8, wherein the one or more sensors further comprises a tamper output connected to a tamper line in the cable, the tamper output used to conduct the test of the cable.

15. A non-transitory computer-readable medium embodying a program for improving the accuracy of resource usage counting of a metered resource, the program executable by a processor of a computing device and comprising code for:
- disabling first and second interrupts used by the processor of the computing device to count pulses received from a utility meter on respective first and second wires of a cable;
- detecting and recording a data level for the first wire attached to one or more sensors of the computing device, the data level indicating whether a pulse is presently being received on the first wire;
- disconnecting a common ground in the cable between the computing device and the utility meter;
- initiating performance of a test of the cable; and
- in response to the test of the cable concluding and detection of the pulse on the first wire:
  - enabling the second interrupt corresponding to the second wire while the common ground is disconnected and the first interrupt is disabled;
  - connecting the common ground while the first interrupt is disabled and the second interrupt is enabled; and
  - enabling the first interrupt corresponding to the first wire on which the pulse was detected.

16. The non-transitory computer-readable medium of claim 15, further comprising code that, in response to the test of the cable concluding and no pulse detected on the first wire:
- enables the first interrupt corresponding to the first wire while the common ground is disconnected and the second interrupt is disabled;
- connects the common ground while the second interrupt is disabled and the first interrupt is enabled; and
- enables the second interrupt corresponding to the second wire.

17. The non-transitory computer-readable medium of claim 15, wherein the computing device is part of a mesh network comprising other computing devices attached to utility meters.

18. The non-transitory computer-readable medium of claim 15, further comprising code for distinguishing voltage changes on the wires representing pulses from electrical noise.

19. The non-transitory computer-readable medium of claim 15, further comprising code for causing the computing device to transmit an alarm to an administrative server accessible via a network when the cable fails to pass the test.

20. The non-transitory computer-readable medium of claim 15, wherein the first wire is connected to a normally open (NO) input on the one or more sensors, and the second wire is connected to a normally closed (NC) input on the one or more sensors.

* * * * *